United States Patent [19]

Suzuki et al.

[11] 4,031,998

[45] June 28, 1977

[54] AUTOMATIC SORTING CONVEYOR SYSTEMS

[75] Inventors: Shin Suzuki, Tokyo; Masami Uesugi; Michi Sekine, both of Yokohama, all of Japan

[73] Assignee: Rapistan, Incorporated, Grand Rapids, Mich.

[22] Filed: Mar. 4, 1976

[21] Appl. No.: 663,853

[30] Foreign Application Priority Data

Mar. 20, 1975 Japan .............................. 50-32945

[52] U.S. Cl. .............................. 198/365; 209/73; 214/11 R; 198/802
[51] Int. Cl.[2] ........................................ B65G 43/00
[58] Field of Search ................ 209/73, 122, 124; 198/38, 154, 155, 185, 187, 195, 365, 796, 802; 214/11 R, 62 R, 62 A

[56] References Cited

UNITED STATES PATENTS

| 3,147,845 | 9/1964 | Harrison et al. | 198/365 |
|---|---|---|---|
| 3,167,192 | 1/1965 | Harrison et al. | 214/62 A |
| 3,231,066 | 1/1966 | Harrison et al. | 198/365 |
| 3,233,720 | 2/1966 | Atanasoff et al. | 198/38 |
| 3,395,785 | 8/1968 | Rysti | 198/38 |
| 3,510,014 | 5/1970 | Speaker et al. | 198/155 X |
| 3,669,245 | 6/1972 | Wooten et al. | 198/155 |
| 3,897,875 | 8/1975 | Luckett | 198/365 X |

*Primary Examiner*—Drayton E. Hoffman
*Assistant Examiner*—Joseph J. Rolla
*Attorney, Agent, or Firm*—Price, Heneveld, Huizenga & Cooper

[57] ABSTRACT

In an automatic conveyor system, a plurality of independently operable carrier or transport structures are interconnected in closed loop configuration. Each carrier includes plural sheets of overlapping slats, each supported by a carriage which allows the slat to pivot for differential vertical flight level movement and tilting to either side for deposition of articles onto selected receiving stations. A plurality of carriages and slats form an independently operable unit to complement the article size structure with one of the slat supporting carriages in each unit having actuating elements in the form of a horizontal arm to each side with a roller which can be deflected for tilting. The single tilting of this arm causes all of the associated slats in that unit to tilt in unison as a result of their overlapping nature.

6 Claims, 9 Drawing Figures

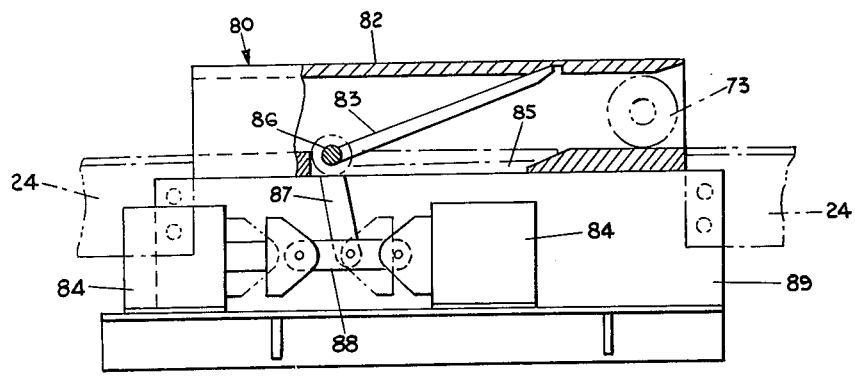
FIG. 6
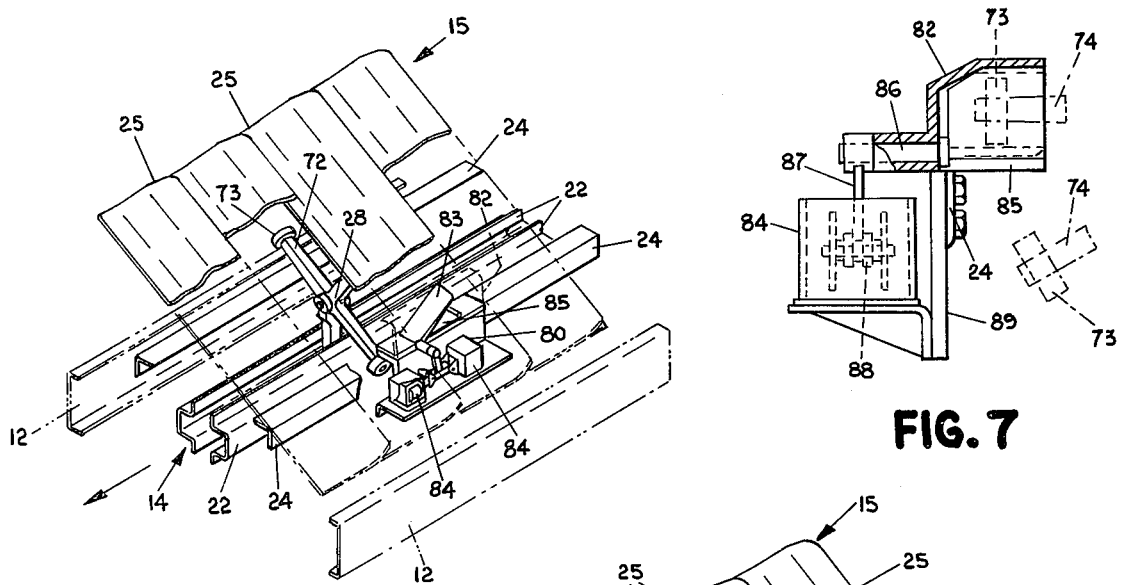
FIG. 7
FIG. 8
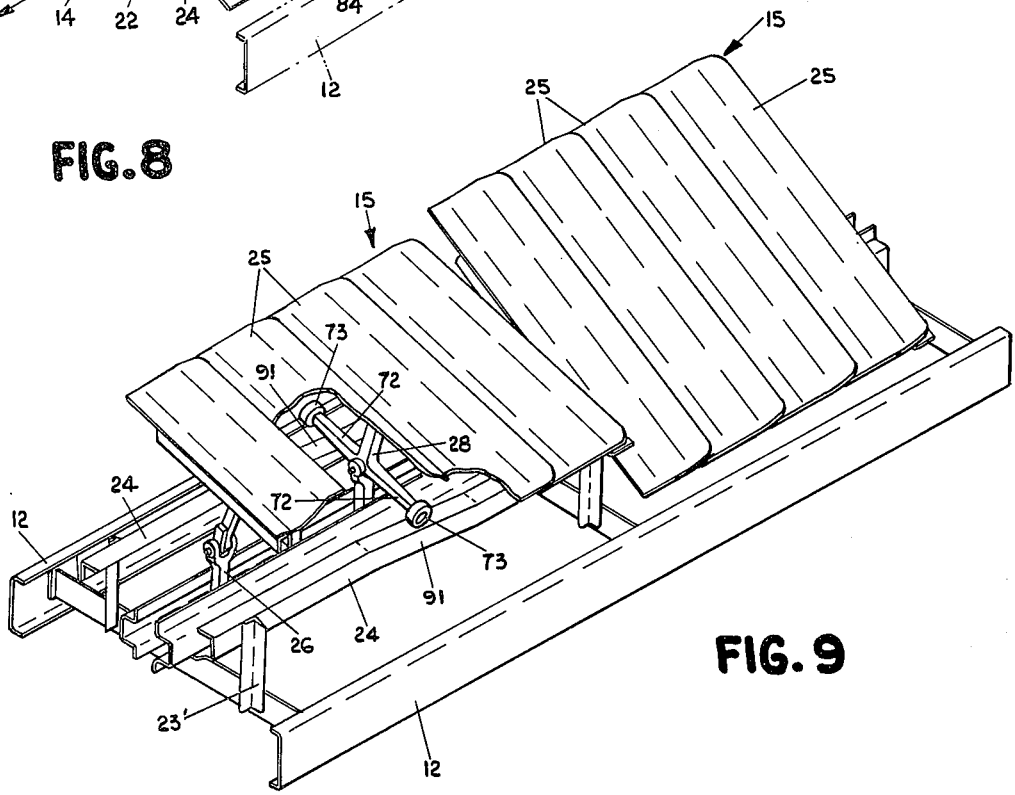
FIG. 9

AUTOMATIC SORTING CONVEYOR SYSTEMS

BACKGROUND OF THE INVENTION

The present invention relates in general to a conveyor system and in particular to an automatic sorting conveyor system which can be arranged in any desired loop configuration and which is capable of automatically and arbitrarily sorting a variety of articles of various sizes being transported.

In a hithertofore known automatic conveyor system, a plurality of single-sheet trays of a size corresponding to that of the articles to be transported has been employed to form an endless conveyor with each of trays being supported tiltably on a bogie having four wheels and locked normally in an untiltable position. The bogies are connected to an endless chain so as to form the endless loop conveyor. Such conventional conveyor system has, however, many drawbacks. For example, in the running of the bogies having four wheels but provided with no differential gear mechanism, there may be slippage between the inside and outside wheels due to a difference in speed therebetween when the bogies are running at a curved portion of the conveyor track. For this reason, restriction is imposed to the curvature of the curved portion of the track in dependence on the size of the bogies as employed and the speed at which they are to run. Additionally, because the conveyor chain used for the coupling of the bogies in the hitherto known conveyor are not of the universal type, the bogie can not run on the track having different vertical levels in the extension thereof, since the coupling chain is not able to bend in the vertical direction. Further, complex and expensive structures are required because of the necessity of the tilting and the locking mechanisms.

SUMMARY OF THE INVENTION

An object of the present invention is, therefore, to eliminate the disadvantages of the conventional conveyor system as above mentioned. To this end, the invention contemplates a novel structure of a conveyor system in which a transporting or carrier structure composed of plural sheets of slats disposed with their end portions being partially superposed to one another are connected to an endless conveyor chain in a loop-like fashion which has links connected to one another through cross pins so that the chain may be bent universally in any direction. Thus, there is provided in accordance with the present invention an improved automatic sorting conveyor system which can employ a conveyor track of a closed loop configuration having curved portions of small curvature and differences in the vertical level and which is provided with carrier or transporting structures each having a simple and reliable tilting and switching mechanisms.

The above and other objects and advantages of the invention will become more apparent from the following detailed description made with reference to the accompanying drawings which show a preferred embodiment of the invention.

BRIEF DESCRIPTION OF THE DRAWINGS

FIG. 6 is a side elevational view of a switching apparatus shown with portions broken away;

FIG. 7 is an end view of the switching apparatus with some portions shown in section;

FIG. 8 is a perspective view showing a tilted carrier and the switching mechanism with some portions broken away; and FIG. 9 is a perspective view illustrating the resetting of the tilted carrier structure at the restoring station.

DESCRIPTION OF THE PREFERRED EMBODIMENT

Figure 1:
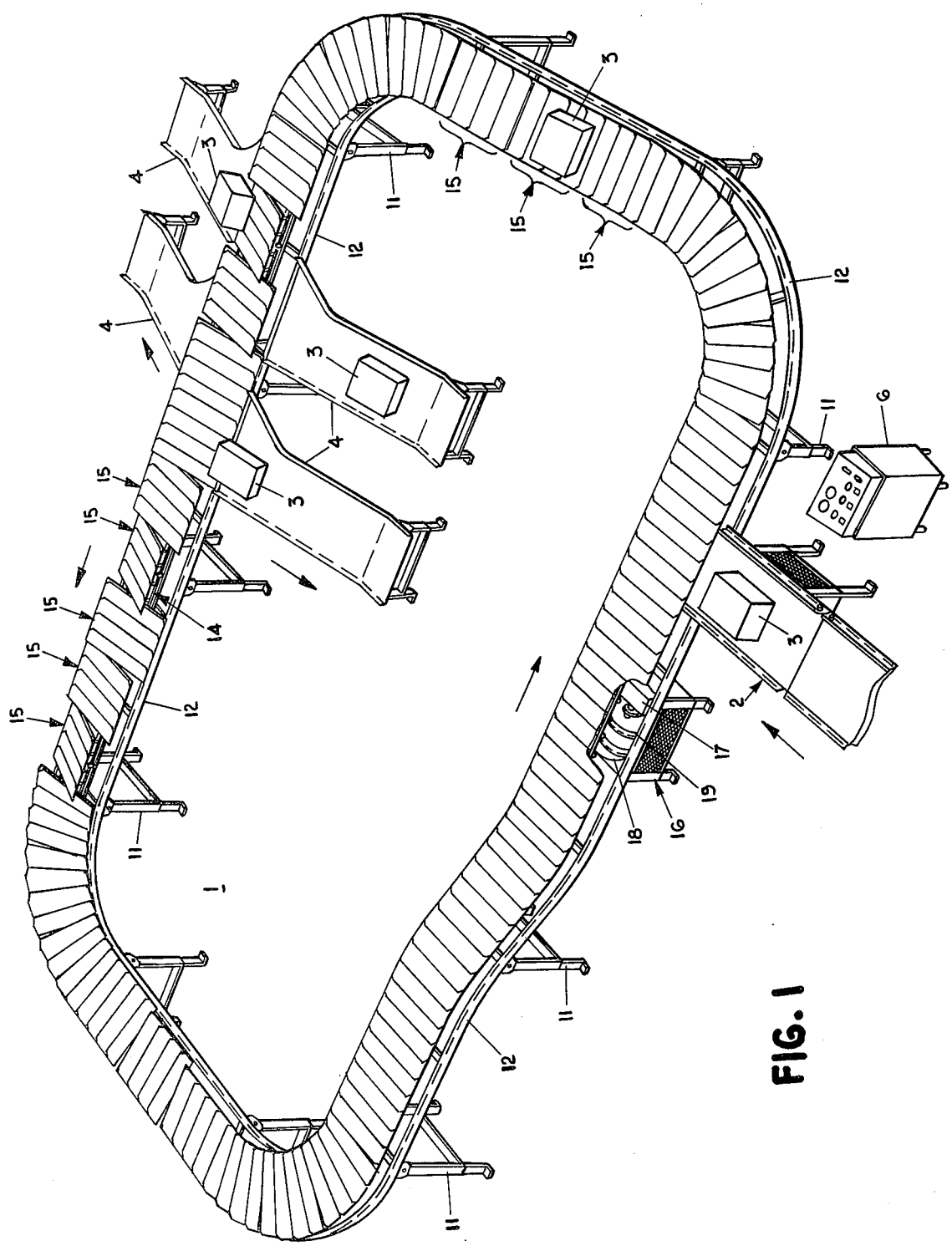
FIG. 1 is a schematic perspective view showing generally an embodiment of the automatic sorting system according to the invention.
Figure 2:
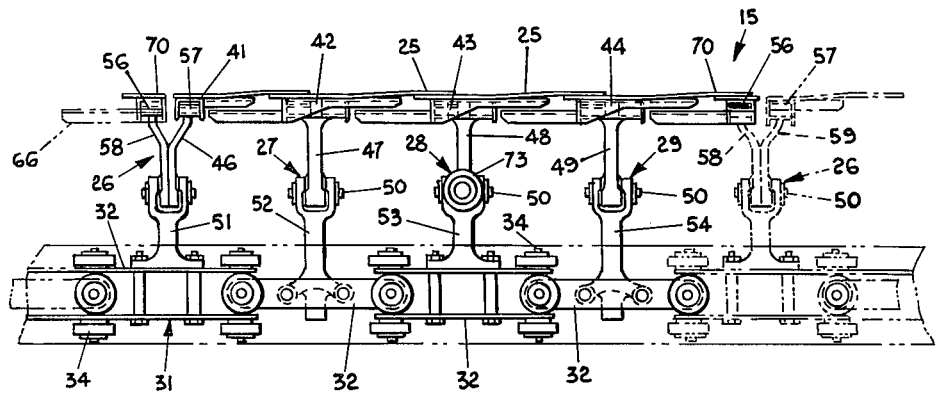
FIG. 2 is a side view showing one of carrier structures employed in the conveyor system.

Referring to FIG. 1, reference numeral 1 generally indicates a conveyor system according to the present invention which comprises a plurality of supporting legs 11, a frame structure 12 constructed in a desired loop configuration and fixedly secured at a desired height by means of the supporting legs 11, a guide rail structure 14 extending substantially along the longitudinal axis of the supporting frame 12, a plurality of transporting or carrier structures 15 connected to one another in an endless fashion and adapted to be guided by the guide rail 14, and a driving apparatus 16 for driving the carrier structures 15. It will be noted that the supporting frame 12 is stationally disposed so as to form a desired planar closed loop at a predetermined adjustable height by the height-adjustable supporting legs 11 in compliance with the height of a standby conveyor 2 installed at a loading station where articles 3 to be transported and sorted are loaded onto the conveyor 1 as well as the vertical level of sorting chutes 4 at sorting stations. The guide rail structure 14 comprises a center rail 22 (FIGS. 3–9) secured to the supporting frame 12 and extending along the longitudinal axis thereof and a pair of lateral rails 24 disposed at both sides of the center rail 12 spaced therefrom.

Each of the carrier structures 15 is adapted to run along the guide rail structure 14 and to be tilted at desired stations. The carrier structures each include plural sheets of slats 25 (four sheets in the illustrative embodiment in a nonrestrictive sense) which are supported by supporting mechanisms 26, 27, 28 and 29 with the end portions of the slats being partially superposed over one another. The conveyor belt constructed by a plurality of groups each comprising plural sheets of these slats 15 is driven by a driving apparatus 16 in the direction indicated by arrows. The driving apparatus 16 is composed of an electric motor 17 and a drum 18 rotatably driven by the motor 17 and having a spiral groove 19 formed in the peripheral surface thereof. One of wheels 34 of a conveyor chain 31 coupling the carrier structures 15 in the endless manner is engaged in the groove 19 of the drum 18 whereby the conveyor chain and hence the carrier structures are driven forwardly upon the rotation of the drum 18.

In the operation of the automatic sorting conveyor system shown in FIG. 1, when the unloaded or idle carrier structure 15 approaches the standby conveyor 2 on which the articles 3 to be transported and sorted rest, a control apparatus (not shown) is supplied with a command signal from a destination command apparatus 6 provided in the vicinity of the standby conveyor 2, thereby to drive the latter to transfer the articles onto the carrier structure 15. At this time, the control apparatus is applied with another command signal representing the destination station where the articles 3 are to be unloaded or sorted. When the carrier structure 15 thus loaded with the articles 3 reaches at a predetermined sorting station, the carrier structure 15 is tilted whereby the articles slide down upon the chute 4 to be sorted.

The destination command apparatus, the control apparatus and the sorting chutes employed in conjunction with the operation of the automatic conveyor system of the present invention are well known in the art and do not constitute an essential part of the invention. Accordingly, further detailed description of these components will be omitted herein. It will be self-evident to those skilled in the art that the command of destination may be effected by using an electronic computer in place of the destination command apparatus or, alternatively, by employing photocell, or limit switch arrangements with destination identifying cards allotted to the articles or carrier structures. Of course, the sorting chutes at the sorting stations may be replaced by a roller conveyor or a belt conveyor.

Now, the invention will be described with reference to FIGS. 2–9 which show in some detail the carrier structure 15, the guide rail structure 14 and the switching mechanism for the automatic sorting conveyor system according to the invention.

Referring at first to FIGS. 2–5, each of the carrier structures 15 is essentially composed of plural sheets of slats 25 having end portions superposed to one another, supporting mechanisms 26, 27, 28 and 29 and the conveyor chain 31 for coupling the supporting mechanisms 26, 27, 28 and 29 in an endless manner. Although the carrier structure 15 is shown as composed of four sheets of slats 25 in the illustrated embodiment, is should be understood that an arbitrary number of slats 25 may be employed. Slats 25 are fixedly supported by the supporting mechanisms 26, 27, 28 and 29. In more detail, the first slat as viewed in the moving direction of the conveyor is supported by the supporting mechanism 26, while the second, third, and fourth slats are supported by the structures 27, 28 and 29, respectively. Each of these supporting mechanisms is mounted to the individual links 32 of the conveyor chain 31 in a manner shown in the drawings. The supporting structures 26, 27, 28 and 29 are constructed by supporting plates 41, 42, 43 and 44, yoke members 46, 47, 48 and 49, and fork members 51, 52, 53 and 54 which are pivotally connected to the yoke members 46, 47, 48 and 49 by pins 50 and secured to the respective links 32 of the conveyor chain 31 so that the supporting structures may be tilted. In case of the first supporting structure 26, it will be seen that the supporting plate 41 and the yoke member 46 are, respectively, divided into two corresponding members 56:57 and 58:59 so that a half portion of the supporting mechanism 26 may be utilized in the proceeding carrier structure 15. The second, third and fourth supporting plates 42, 43 and 44 have, respectively, slat mounts 62, 63 and 64 extending rearwardly as viewed in the direction of the conveyor movement at the both sides of the supporting plates and additionally have another slat mount 67, 68 and 69 extending forwardly beneath mounts 62, 63 and 64 in supporting contact therewith. In case of the first supporting structure 26, a similar slat mount 61 extends rearwardly from the plate member 57 secured to the yoke member 59, while a slat mount 66 extends forwardly from the plate member 56 secured to the yoke member 58. Secured to the mount plate 56 is a slat member 70 which extends in contact with and beneath the last slat of the proceeding carrier structure. It will be easily appreciated that the same holds true in case of the fourth slat 25.

Figure 3:
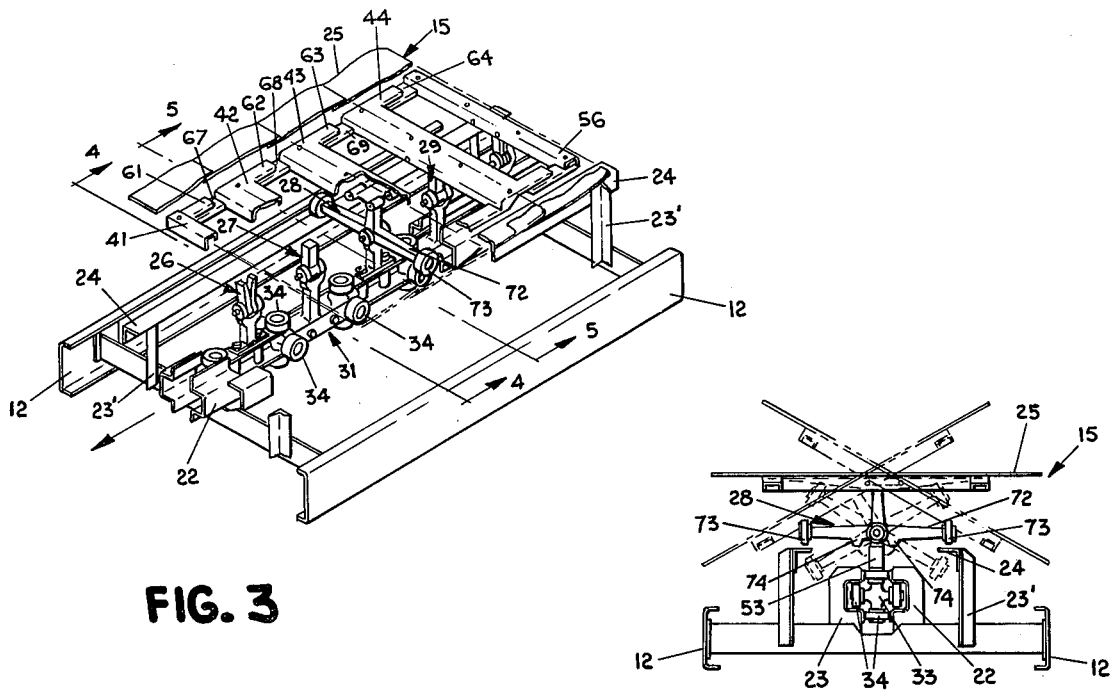
FIG. 3 is a perspective view of the carrier structure with some portions broken away for clarity.
Figure 4:
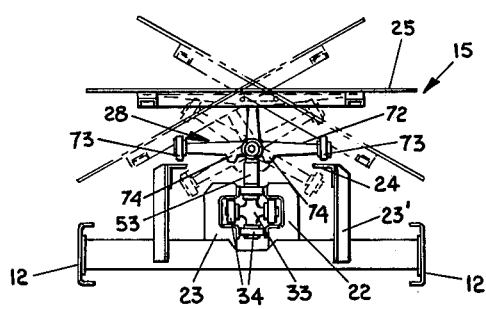
FIG. 4 is a sectional view taken along the line 4—4 in FIG. 3.
Figure 5:
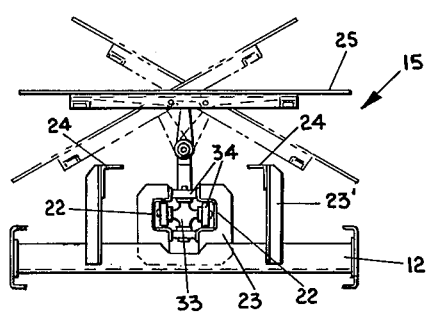
FIG. 5 is a sectional view taken along the line 5—5 in FIG. 3.

In the third supporting structure 28 of the carrier structure 15, there are provided a pair of horizontally extending lateral arms 72 each of which has a supporting wheel 73 serving to support normally the carrier structure 15 at the free end portion thereof. These supporting wheels or rollers 73 are adapted to run along the guide rails 24 of the rail structure 14 and tilt the carrier structure 15 at a desired sorting position with the aid of the switching mechanism 80 described hereinafter. The fork members 51, 52, 53 and 54 of the supporting mechanisms 26, 27, 28 and 29 of the carrier structure 15 are connected through respective generally cruciform shape cross pin structures 33 to the associated links 32 of the conveyor chain 31 which are connected easily bendable for any lateral or horizontal movements. The cross pin 33 has four guide wheels or rollers 34 at the respective free ends which wheels are engageable with the guide rail 22 of the rail structure 14. The guide rail 22 is composed of rail members each having a configuration such as shown in FIG. 3 and supported by the supporting member 23. The guide rail is secured to the supporting frame 12. In this manner, the supporting mechanisms 26, 27, 28 and 29 are connected to one another in an endless fashion through the links 32 while the links are interconnected through the cross pins 33. The cross pin structures thus provide a universal joint type of pivotal connection between each of the adjacent links 32 whereby the supporting mechanisms can be moved along a horizontally or vertically curved track as defined by the rail structure. Further, since the four sheets of slats 25 are partially superposed to one another at their end portions, the tilting of the third supporting mechanism 28 as caused by the switching mechanism 80 at a desired sorting location will bring about a simultaneous tilting of all the four slats 25. For this reason it is sufficient to provide a single tilting mechanism comprising the arms 72 and the wheels 73 for one of the four supporting mechanisms 26, 27, 28 and 29, such as, for example, the third supporting structure 28 as is the case of the illustrated embodiment.

The switching mechanism for tilting the carrier structure thereby to sort the articles is provided for in the guide rail 24 at a desired sorting location in a position to be compatible with the sorting chutes 4 or sorting conveyors.

As is shown in FIGS. 6, 7, 8 and 9, the switching mechanism 80 comprises a guide channel member 82 of an inverted C cross section secured to a frame 89 supporting the guide rail 24, a swingable plate 83 pivotally supported by a pin 86 and swingable in a notch 85 formed in the track surface section of channel member 82 and an electro-magnetic solenoid apparatus 84 for actuating the swingable plate 83. Pin 86 is integrally formed in the swingable plate 83 at an end thereof and extends through the bearing portion of channel member 82. A lever 87 is secured to pin 83 at the extending end thereof. The lever 87 in turn has its other end connected to a link of the electro-magnetic solenoid apparatus 84. Upon actuation of the solenoid 84, the swingable plate 83 is caused to rotate around pin 86.

When the solenoid apparatus of a selected switching mechanism is energized by an electric signal commanding the sorting of the articles 3 being carried, the swingable plate 83 is rotated upwardly and the notch 85 is thereby opened. When a desired carrier structure 15 has thereafter reached the position of the thus set switching mechanism 80, the corresponding one of wheels 73 mounted on the lateral arms 72 is guided through the notch 85 along the lower side surface of the swingable plate 83, as a result of which the supporting mechanism 28 and hence the whole carrier structure 15 are tilted. Thus, the articles 3 on the carrier structure 15 will slide down onto the chute 4 to be sorted. The carrier structure 15 thus unloaded is moved to a location where a resetting guide rail 91 is provided with the tilted position of the carrier structure being maintained as it is since the center of gravity of the structure is offset from the geometrical center thereof. The resetting guide rail 91 is provided at a location spaced from the sorting station by a suitable distance and serves to restore the tilted position of the carrier structure to the horizontal position (FIG. 9). The tilting angle of the carrier structure 15 is restricted to a predetermined value by means of a projection 74 (FIG. 4) disposed below arm 72 and adapted to strike against the fork member 53 of the supporting structure 28.

It will be evident to those skilled in the art that the electro-magnetic solenoid apparatus 84 of the switching apparatus may be replaced by a pneumatic or hydraulic mechanism. Similarly, a caterpillar drive may be employed in place of the screw drive drum 18 for driving the carrier structure 15.

OPERATION

The operation of the automatic sorting conveyor system according to the present invention having the construction as above described is as follows:

As hereinbefore described with reference to FIG. 1, the automatic sorting conveyor apparatus according to the present invention is installed in a desired closed loop track configuration having curved portions and different heights with the heights of the standby conveyor 2 at the loading station and the sorting chute 4 at the sorting stations being considered. In operation, a command signal representing the sorting station associated with the articles 3 resting on the standby conveyor 2 is supplied to a control apparatus (not shown) from the destination command apparatus 6. When the idle carrier structure 15 is moved near the standby conveyor 2 under the control of the controller not shown, the latter is operated to transfer the articles 3 to the carrier structure 15. When the carrier structure 15 thus loaded with the articles 3 approaches the designated sorting station, the control apparatus in which the corresponding sorting location is stored produces a changing-over command to the switching mechanism 80 upon which the solenoid 84 is energized to actuate the swingable plate 83. The switching of the guide rail thus involved will, in turn, cause the carrier structure 15 to be tilted at the predetermined location whereby the articles 3 will slide down onto the selected sorting chute 4. Thereafter, the carrier structure 15 thus having been unloaded is moved to the resetting location in the tilted state and restored to the horizontal position by the resetting guide rail 91 (FIG. 9).

In this manner, the automatic sorting conveyor system according to the present invention employed in combination with a conventional destination command apparatus and control apparatus will allow an automatic transportation of articles from the standby conveyor to a desired or predetermined sorting location designated by the destination command apparatus under the control of the control apparatus. Further, since in the automatic conveyor system according to the invention the conveyor means includes a plurality of carrier structures each having plural sheets of slats, for example, four sheets of slats, and connected to a conveyor chain in an endless fashion with the individual slats being partially superposed to one another, it is sufficient for the tilting operation of the carrier structure to provide a single supporting wheel assembly for each of the carrier structures. Besides, due to the feature that the links of the conveyor chain are interconnected bendably both in the horizontal and the vertical directions through cross pins having guide wheels at every arm, a loop-like conveyor track may be installed in any desired configuration or arrangement having various heights and laterally curved portions of relatively smaller radii so as to comply with the conditions imposed by the available space. By virtue of the feature that the sorting or unloading operation can be effected by the switching operation of the single supporting wheel assembly provided for each of the carrier structure, the efficiency of the sorting operation is highly improved. In accordance with the disclosed teaching of the invention, the tilting mechanism for the carrier structures, the switching mechanism for the guide rail as well as the conveyor driving apparatus can be realized in simplified and reliable constructions. The inventive conveyor system can be applied to a variety of sorting operations for various articles such as cardboard boxes, small sized articles, bag packages or the like. Because of the arrangement of the slats for each of the carrier structures being partially superposed to one another at the leading and trailing end portions, the slat arrangement may be considered dynamically as an integral structure and therefore the supporting of the articles as loaded as well as the transmission of the force for tilting the individual slats can be effected smoothly. It will be further noted that the individual slats can be slidably moved relative to one another at the curved path. This feature together with the above mentioned universal linkage assures that the inventive system can be satisfactorily employed even under the condition where considerable curved or horizontally bent or inclined paths are required.

Obviously, many modifications and variations of the invention are possible in light of the above teachings and it will be apparent to those skilled in the art that various changes in form and arrangement may be made to suit requirements without departing from the scope of this invention. Accordingly, it is intended that the equivalent arrangements be included unless the following claims by their wording expressly state otherwise.

The embodiments of the invention in which an exclusive property or privilege is claimed are defined as follows:

1. In an automatic sorting conveyor system including a plurality of support structures to support articles for movement along said conveyor, said support structures being adapted to move in endless fashion along a predetermined path formed by first guide means in said conveyor to thereby receive articles and deposit same at predetermined sorting stations along said path, and driving means for urging said supporting structures along said path, the improvement comprising:

said first guide means being formed centrally along said predetermined path;

each said supporting structure forming an independent article supporting surface including a plurality of slat elements, said slat elements in each said supporting structure being disposed in overlapping relationship;

each said supporting structure including a plurality of carriage means, each said carriage means individually supporting an associated one of said slat elements for movement along said path, said carriage means being supported in said first guide means for movement along said predetermined path;

pivot means on each said carriage means for each of said plurality of slat elements in each said support structure whereby said plurality of overlapping slat elements in each of said support structures can be pivoted about said pivot means and shifted in unison between a level position and a tilted position independently of the position of adjacent upstream and downstream support structures;

actuating means connected to at least one of said carriage means in each of said support structures to cause same to pivot about said pivot means;

second guide means for said actuating means, said second guide means being arranged along said predetermined path on opposite sides of said first guide means and adapted to receive and guide said actuating means to normally maintain said plurality of slats in said level position;

switching means associated with said second guide means, said switching means being disposed proximate said sorting stations along said path, said switching means being adapted for cooperative operation with said actuating means and said second guide means to shift said support structure to said tilted position at said sorting station to thereby deposit articles carried on said support structure at said sorting station.

2. The automatic sorting conveyor system of claim 1 wherein said actuating means comprises an arm member fixed to said carriage means and extending generally perpendicular thereto; roller means on the outwardly extending end of said arm member, said second guide means including a channel-like track member, said roller means being adapted to follow along said track member, said switching means including a deflector element selectively positionable between first and second positions in said track member, said switching means when in said first position forming a continuation of said track member and in said second position urging said roller means out of engagement with said track member to thereby cause said arm and said slat associated therewith to assume a tilted position.

3. The automatic sorting conveyor system of claim 2 wherein said deflector element is pivotally mounted in said track member and extends therealong, and further including actuator means connected to said deflector element for pivoting same between said first and second positions.

4. An automatic sorting conveyor system comprising:

a plurality of independently operable transport structures interconnected in closed loop configuration for movement along a predetermined path;

each said transport structure including a plurality of overlapping slat elements, said overlapping slat elements cooperatively forming an article receiving surface;

carriage means individually supporting an associated one of said slat elements, said carriage means being mounted in track means generally centrally located along said conveyor for movement along said predetermined path;

support means connecting each said slat element with the associated carriage means, each said support means including first and second members, said first member being fixed to said slat element and said second member being fixed to said carriage;

pivot means joining said first and second members intermediate said slat element and said carriage means whereby said slat elements may be tilted in unison with respect to said carriage;

an actuating member fixed to said first member of at least one of said support means and extending outwardly therefrom in a direction transverse to said predetermined path;

guide means positioned on opposite sides of said track means for receiving said actuating member, said guide means and said actuating member cooperatively normally holding said plurality of slat elements in a level article carrying position;

switching means disposed along said predetermined path at selected sorting stations, said switching means being operatively connected to said guide means to selectively release said actuating member from said guide means whereby said plurality of slat elements will tilt in unison from said level position whereby articles carried on said transport structure will be deposited at said sorting station.

5. The automatic sorting conveyor system of claim 4 wherein said actuating member comprises an arm member fixed to said first member and extending generally perpendicular thereto; roller means on the outwardly extending end of said arm member, said guide means including a channel-like track member, said roller means being adapted to follow along said track member, said switching means including a deflector element selectively positionable between first and second positions in said track member, said switching means when in said first position forming a continuation of said track member and in said second position urging said roller means out of engagement with said track member to thereby cause said arm and said slat associated therewith to assume a tilted position.

6. The automatic sorting conveyor system of claim 5 wherein said deflector element is pivotally mounted in said track member and extends therealong, and further including actuator means connected to said deflector element for pivoting same between said first and second positions.

* * * * *